United States Patent [19]
Lem

[11] Patent Number: 4,841,562
[45] Date of Patent: Jun. 20, 1989

[54] TELEPHONE VCR CONTROL

[76] Inventor: Steven Lem, 3711 Brayton Ave., Long Beach, Calif. 90807

[21] Appl. No.: 77,439

[22] Filed: Jul. 24, 1987

[51] Int. Cl.⁴ .......................... H04M 11/00; J04Q 9/00
[52] U.S. Cl. ..................................... 379/104; 379/105; 379/77; 358/194.1; 455/603
[58] Field of Search ................. 379/102, 104, 105, 74, 379/66; 358/194.1; 360/79; 455/603, 607

[56] References Cited

U.S. PATENT DOCUMENTS 4,495,386  1/1985  Brown et al. ........................ 379/66

FOREIGN PATENT DOCUMENTS 0095658  5/1986  Japan ................................... 379/102
2166322  4/1986  United Kingdom ................ 379/102

Primary Examiner—Jin F. Ng
Assistant Examiner—Wing Fu Chan

[57] ABSTRACT

The invention is an add-on device which allows programming of an existing VCR (video cassette recorder) via standard phone lines. With it attached to a VCR, the user is able to call home and advance program the invention to turn on the VCR at a certain time, change to a desired channel, and start and stop recording at a certain time. These commands would be transferred and entered through the use of standard telephone "Touch Tone" signals. A voice-synthesized response from the invention would return through the phone lines to verify correct instructions. No electrical connection is made directly to the VCR. In addition, no permanent physical or visual alterations of the VCR are made. Thus, the invention is designed to remain mounted to the rear of the VCR indefinitely, since it will not hinder the normal functioning of the VCR, nor its remote control. It also may be removed without damage and installed on another VCR, if desired.

4 Claims, 7 Drawing Sheets

TELEPHONE VCR CONTROL

DESCRIPTION AND OPERATION OF PREFERRED EMBODIMENTS

Figure 1:
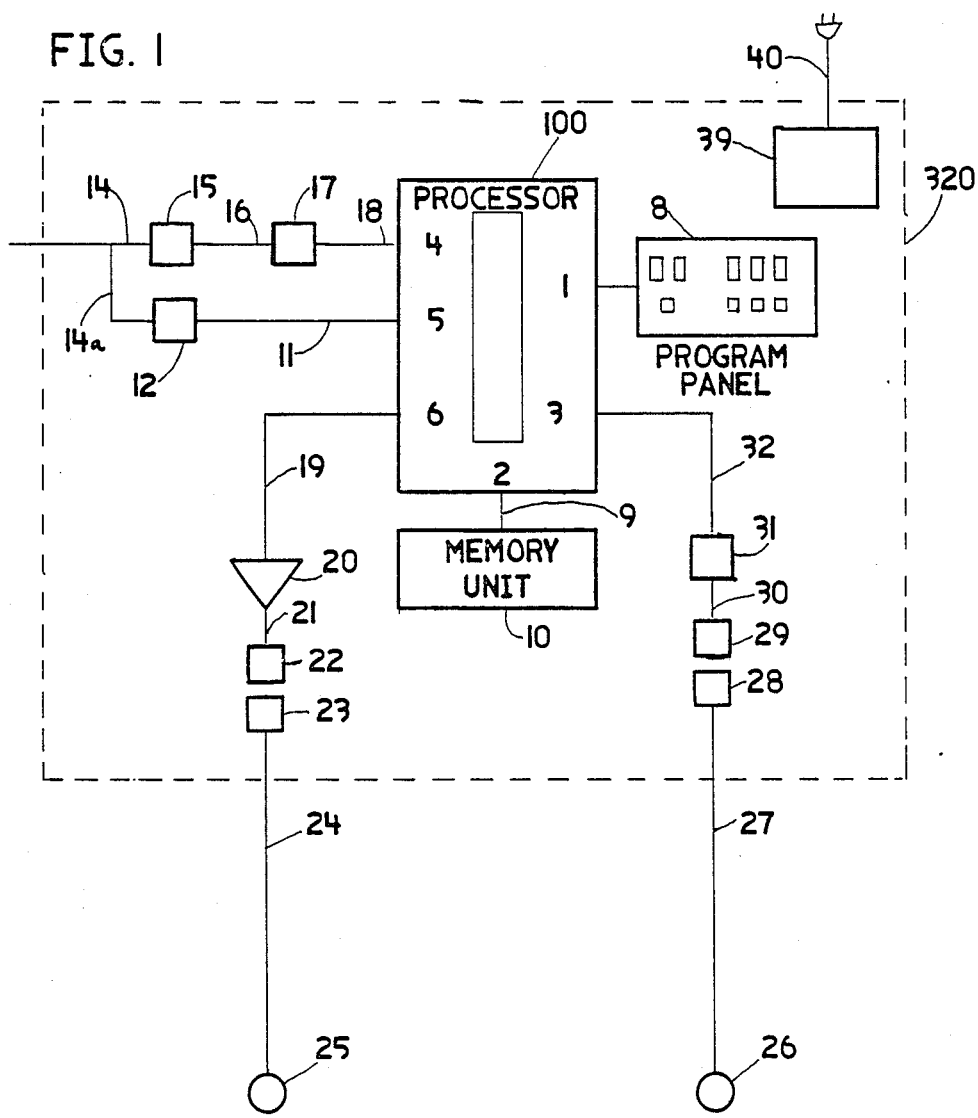
FIG. 1 is a schematic diagram showing a preferred embodiment of the present invention.

FIG. 1 shows a schematic diagram of the preferred embodiment of the present invention. It contains a Processor 100 with Ports 1, 2, 3, 4, 5 and 6 connected to it. Port 1 is connected to a Program Panel though Line 7. This Program Panel is used to key inputs into the Processor 100, and also to read information from the Processor 100.

Port 2 is connected through Line 9 to a Mercury Unit 10. Memory Unit 10 is used to store information entered through Program Panel 8.

Figure 3:
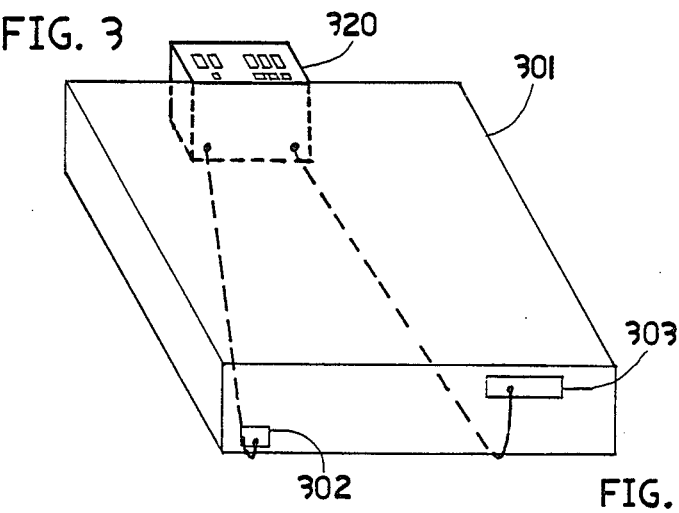
FIGS. 3, 3a–3d are perspective drawings showing the physical embodiment of the present invention.
Figure 3A:
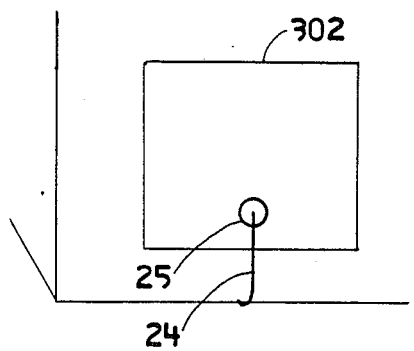

Port 3 is connected through Line 32 to an Analog to Digital Convertor 31. The A to D Convertor 31 receives a signal through Line 30 from Light Sensor 29. Light Sensor 29 receives light through Fiber Optic Coupler 28. Fiber Optic Coupler 28 is optically coupled to Fiber 27. The other end of Fiber 27 connects to Mounting Pad 26. FIG. 3 is a perspective drawing showing the main physical embodiment, called the Controller 320, attached to an existing VCR 301. FIGS. 3a,b,c and d are details of the mounting of Pad 26 as it is attached to the Display Window 303. The Pad 26 is adhesive backed and merely sticks on to the Display Window 303. It is small and transparent so as to cause minimal aberration of the Channel Display. Light emitted by the Channel Display 303 is directed into Fiber 27 by Mounting Pad 26. Fiber 27 carries the light to the Controller 320 to be sensed and quantified.

Figure 4:
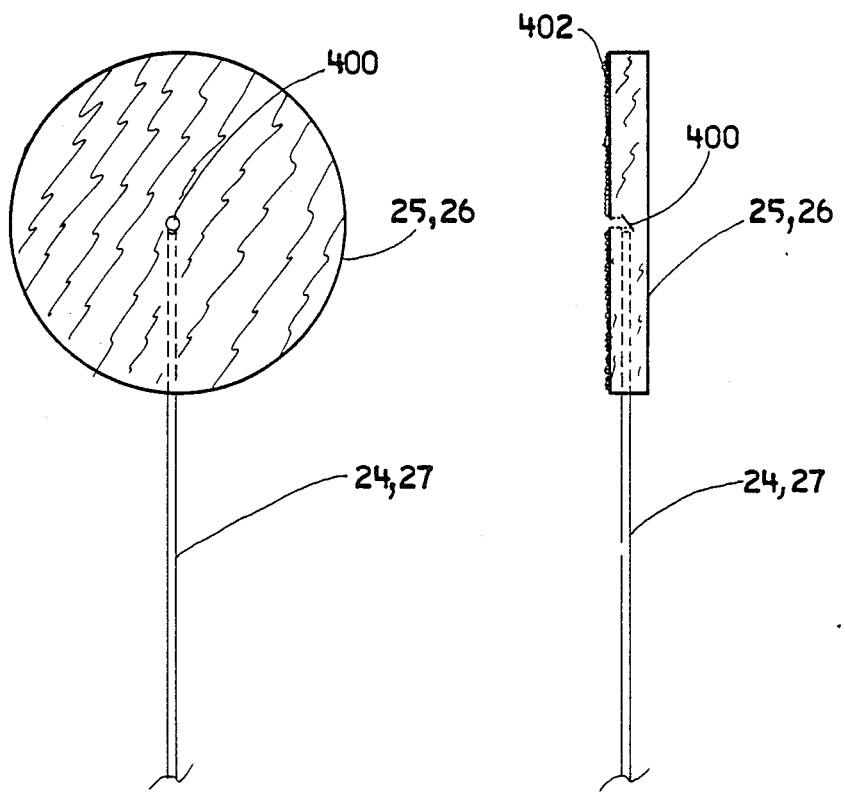
FIG. 4 is a front and side view of the mounting pads.

FIG. 4 shows a front and side view of a preferred embodiment of Mounting Pads 25 & 26. Light travelling through Fiber 24 is reflected by an Internal Reflector 400 of Pad 25. The light is thereby directed generally perpendicularly to the face plate of the VCR. In the case of Pad 26, light emitted by the VCR's channel display is directed by the Internal Reflector 400 into Fiber 27. Only light rays which are generally emitted perpendicular to the face plate of the VCR will be reflected and travel through the Fiber 27, due to the inherent angular input limitation of the fiber type being used.

This limitation can be modified by making Reflector 400 slightly concave or convex of manufacture to suite. In this way, the area of the display to be sensed can be changed. Adhesive 402 is applied to one surface of the Pads 25, 26 to attach to the VCR.

As shown in FIG. 1, the light received through Fiber 27 is coupled to Light Sensor 29. Light Sensor 29 converts this into an electrical signal, sends it through Line 30 to the A to D Convertor 31. The A to D Convertor converts the signal to a digital code and sends that through Line 32 to Port 3 of the Processor 100.

The invention requires connection to an existing Phone Line 14. Phone Line 14 is connected to a Line Receiver 15. The Line Receiver 15 connects the phone line after a set number of rings, or after sensing line connection by modem or phone answering machine. After the line Receiver 15 connects to the Phone Line 14, the Phone Line 14 is connected to a Tone to Digital Convertor 17. The Tone to Digital Convertor 17 monitors the phone line for standard "Touch Tones". If tones are present, they are converted to digital words and are transferred by Line 18 to Port 4 of the Processor 100.

Port 5 is connected through Line 11 to a Voice Synthesizer 12. The Voice Synthesizer 12 responds to digital words from the Processor 100, and creates electrical signals to be sent out over Phone Line 14. The signals are converted by phone at the other end into audible voice patterns. The voice patterns are to provide feedback as to what the Processor is programmed for, and to possibly provide a "help" function if needed.

Port 6 is connected through Line 19 to a Driver 20. Driver 20 is an amplifying device used to increase the Processor 100's signal enough to drive the Light Source 22 through Line 21. Light Source 22 is a near infrared light emitting diode, or similar. Its purpose is to provide infrared pulses like those emitted by the hand held infrared remote control supplied with the existing VCR 301. These pulses control the VCR's 301 functions by stimulating the remote sensor in the VCR 301. Light Source 22's emitted pulses are routed by Fiber Optic Coupler 23 into Fiber 24. Fiber 24 carries them to Mounting Pad 25, which directs the pulses to the remote sensor of VCR 301. In FIGS. 3 and 3a, details of the position of Mounting Pad 25 and Fiber 24 are shown. Mounting Pad 25 is adhesive backed, and merely sticks on to the Remote Sensor Window 22 of the VCR 301. The Mounting Pad 25 is small and transparent, allowing normal use of the supplied hand held remote control.

It is well known that different manufacturers use many designs and layouts for the controls, and physical spacing of same, in different VCRs. Therefore, provision is made to accommodate these differences by the use of the Program Panel 8.

Figure 2:
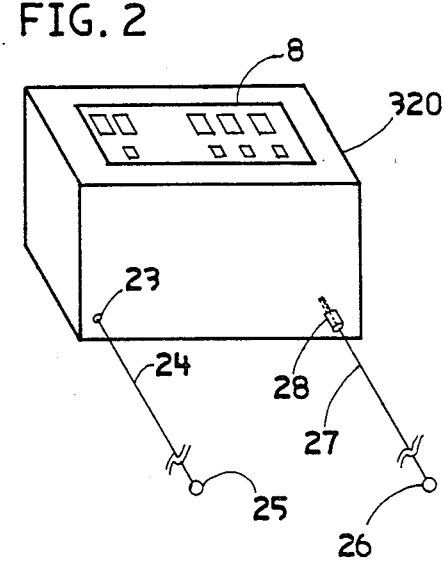
FIGS. 2, 2a, 2b are perspective views of a preferred embodiment of the present invention.
Figure 2B:
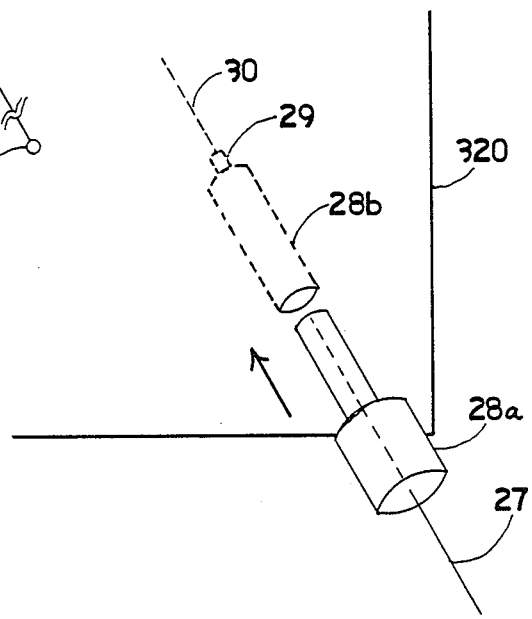
Figure 2A:
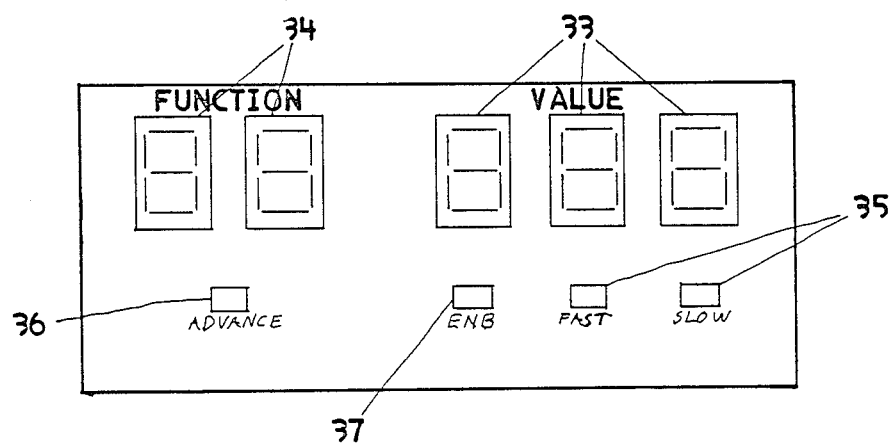

FIG. 2 is a perspective view of a preferred embodiment of the invention, showing detail of the Program Panel 8 FIG. 2a. The Program Panel 8 is located at a user accessible portion of the Controller 320. It consists of 2 numerical readouts, 34 and 33, as well as key Inputs Pads 35, 36 and 37. These are used to enter codes which relate to the variations of the particular VCR to be used.

TABLE 1 is a representative version of a code list to be used with the Program Panel 8. The codes or values are listed in the right hand column, and the function numbres are listed in the left hand column of TABLE 1. The user presses the Function Advance Key 36 to reach each function number, as displayed by function Display 34. The user then consults the chart shown in TABLE 1 to find the corresponding code to the VCR variable. The user enters the code using the Key Input Pads 35, verifies with Code Display 33, and enters the code to memory with Key 37. This procedure is only performed when the invention is first mounted to a VCR. The codes are stored in memory for use.

The Program Panel 8, in conjunction with the Light Sensor 29 (and supporting circuitry), allows the invention to learn and recreate pulses used to control the VCR through its infrared remote sensor. By removing Fiber Optic Coupler 28a from its socket 28b, the Light Sensor 29 is exposed (see FIG. 2b).

For function numbers 1 through 6 in TABLE 1, the hand held infrared remote control is aimed at the Light Sensor 29 while pressing the corresponding function button on the remote. In addition, concurrently holding the Enable Key 37 on the Program Panel instructs the invention to read and store pulses, and relate them to the function number displayed by Function Display 34. This is repeated for functions 1 through 6. The Coupler 28a is then returned to its socket 28b. The final entry to be made is the current time.

The invention now has the remote control pulse information in memory for a specific VCR. It can now emulate these pulses by sending them from Processor 100 through numbers 19, 20, 21, 22, 23, 24, 25 as described previously to control the VCR as desired.

The emulated "channel up" signal is used in conjunction with the Light Sensing Assembly (26 through 32) to select a specific channel on the VCR.

Figure 3B:
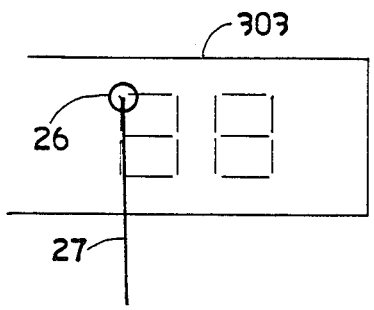

Mounting Pad 26 is positioned over the two left and uppermost digit segments of the Channel Display 303 FIG. 3b. These segments are both unlighted only when the left Digit 305 is a "1". Light emitted by the two segments is directed, sensed and quantified by the Light Sensing Assembly and sent to Processor 100. The Processor 100 repeatedly outputs pulses through the Light Output Assembly (19 through 25) to command channel changes upwards on the VCR. The Processor 100 senses the two segments' light output after each "channel change up." On the first incidence of light being sensed before a "channel change up", and no light after, the display is known to be set on Channel 10. From Channel 10, the Processor 100 can command additional channel changes to reach any desired channel.

Figure 3C:
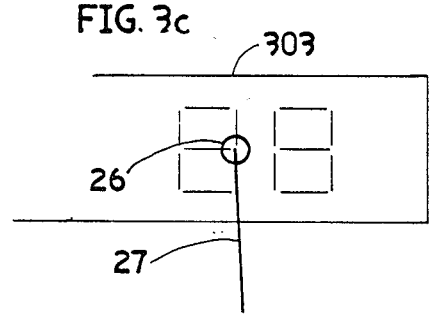

If the channel display blanks the left hand "0", the center of Mounting Pad 26 would be placed over the junction of the three segments on the right hand side of the left hand "tens" digit 305 FIG. 3c. In an upwards channel change, the first incidence of light being sensed before a "channel change up" and no light after, would indicate a Channel #2.

Figure 3D:
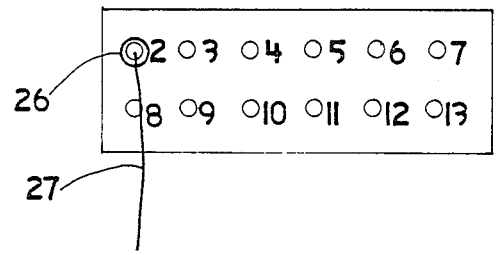

In the case of a VCR with individual lights for each channel, FIG. 3d, Mounting Pad 26 would be mounted to any Channel Indicator Light 320. A "channel change up" signal is given repeatedly until light is sensed. That channel is then known to be selected.

The display type and number of channels are entered using hte Program Panel 8, as described previously.

The invention is connected to a Phone Line 14. A Line Receiver 15 in the invention monitors the Line 14. When a ring signal is sensed, the Line Receiver 15 lets the Line 14 ring several times, and then connects to it (answers). The Processor is informed of the connection. The Processor then commands either the Tone to Digital Convertor 17 or the optional Voice Synthesizer 12, to send a ready tone or voice "READY" back through the Phone Line 14 to the user. The user then presses the "Touch Tone" buttons on his phone in a sequence to instruct the invention to record and stop at a desired time on a desired channel.

When the user presses the buttons on the phone, two audio frequencies are generated and mixed together, and sent out on the Phone Line 14 by the user's phone. These frequencies are standardized "Touch Tones" which correspond to the numbers on the phone's buttons. The Processor receives these tones through the use of the Tone to Digital Converter 17. The Convertor 17 converts the tones into digital words and sends them to the Processor 100 and Memory 10 for storage. The words in sequence tell the Processor 100 how and when to command the VCR.

An example of a sequence is as follows:

To record Channel 4 from 9:00 to 10:00, press on the phone:

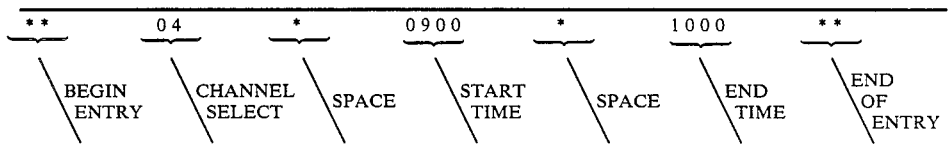

The Processor 100 then waits a few seconds for additional entries. If no further entries are received, the Processor 100 instructs the Voice Synthesizer 12 to read back the user's instructions. Example: "I am programmed to record Channel 4 from 9 o'clock to 10 o'clock. If this is correct, please press the 'star' button again." If the Voice Synthesizer 12 is not optioned, the Processor 100 commands the Line Receiver 15 to terminate the connection (hang up).

A few minutes before the start time, the Processor 100 commands the VCR to turn on, rewind and find the correct channel. At the start time, "Record" is commanded, and at the end time, "Stop" is commanded.

Figure 5:
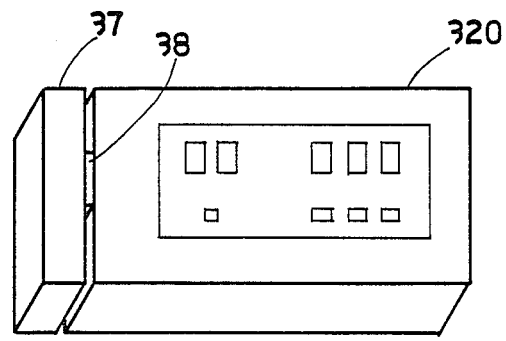
FIG. 5 shows the attachment of an add-on module to the controller.

Another configuration of the invention in its physical form consists of three boxes. The Controller 320 FIG. 1, the Add-On Module 37 FIG. 5 & 6 and the Modem 60 FIG. 7. The Jack 38 on the Comtroller 320 is provided to receive the Add-On Module 37 if desired. The Add-On Module 37 and the Modem 60 are designed to work with the Controller 320 in caess where a phone jack is not conveniently located near the VCR/Controller 320.

A tV/VCR combination is usually placed in a position which is convenient to view, and has a power outlet available. However, the Controller 320 also requires that a Phone Line 14 be connected to it. If the VCR is placed away from a phone jack, the Line 14 must be run from the existing phone jack to the Controller 320. In many caes, this is inconvenient, expensive, or not aesthetically acceptable. If the VCR/Controller 320 is moved occasionally from lcoation to location, a phone jack would need to be installed in each new spot.

By using the Modem 60 and the Add-On Module 37, the Phone Line 14 placement problem is eliminated. The Modem 60 is placed in the house anywhere in which a phone jack and a power outlet are in close proximity.

Figure 6:
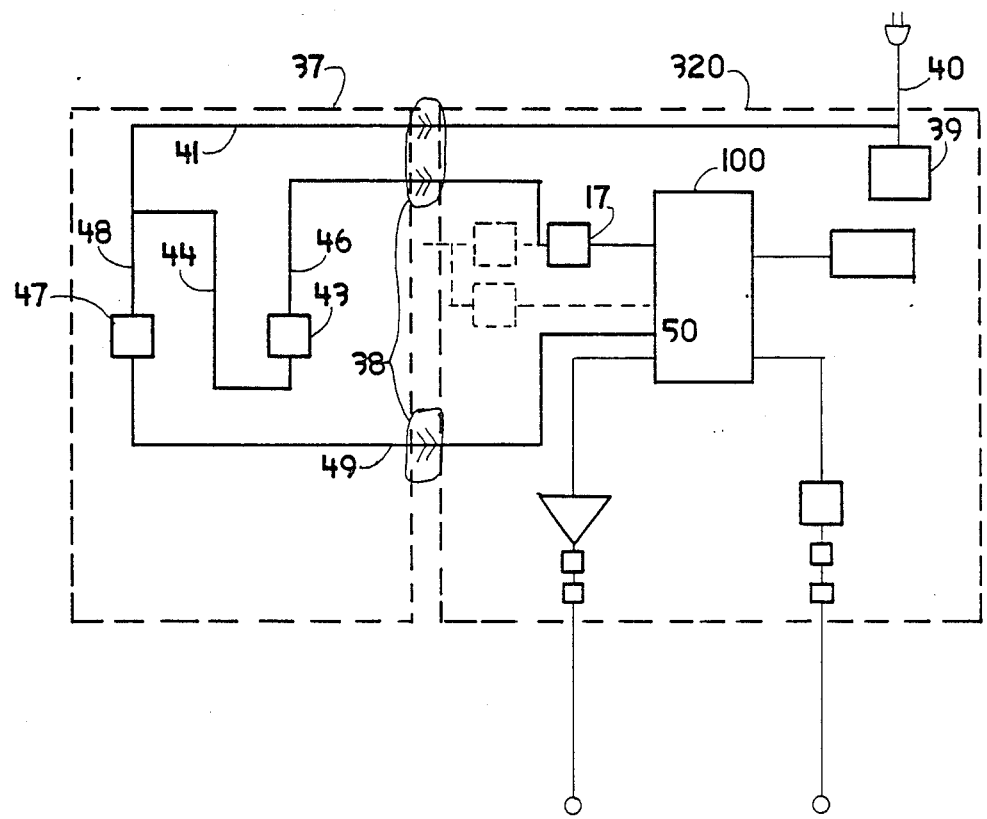
FIG. 6 is a schematic diagram of the add-on module and controller.
Figure 7:
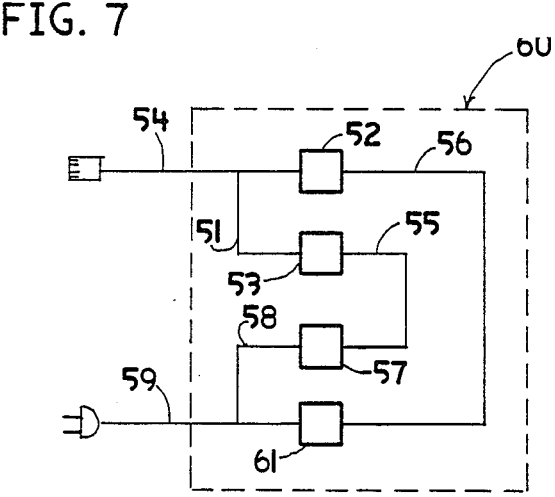
FIG. 7 shows a simplified schematic block diagram of the modem 60.

FIG. 7 shows a simplified schematic block diagram of the Modem 60. The Modem 60 contains a Line Receiver 52 which functions the same as the Line Receiver 15 of FIG. 1. Line Receiver 52 "answers" the Remote Phone Line 54, and transfers the signals through Line 56 to Modulator 61. Modulator 61 mixes a carrier signal with the "touch tone" tones from Line 56, and adds them to the House Power Line 59. FIG. 6 shows a block diagram of the Controller 320, provided with Jack 38, to accept Add-On Module 37.

The Remote House Power Line 59 of FIG. 7 is considered to be connected electrically through the House Power Grid to Power LIne 40 of FIG. 6. The modulated tones on Power Line 59 are received by Demodulator 43 through Lines 44 and 40 (see FIG. 6). The Demodulator 43 removes the carrier and isolates the Line 46 from house power. This leaves only the tones to be sent to the Tone to Digital Convertos 17 by Line 46.

The above arrangement is the functional equivalent of the local Phone Line 14 and Line Receiver 15, fedding into the Tone to Digital Convertor 17 through Line 16 (see FIG. 1).

In this configuration (see FIG. 6), the Processor 100 contains an additional Port 50. Port 50 outputs similar signals to those outputted by Port 5 of FIG. 1. Modulator 47 receives Port 50's signal through Line 49. Modulator 47 adds a carrier signal to Port 50's signal, and sends it over Power Lines 48, 41, 40, 59 and 58 to the Modulator 57 of FIG. 7. The Modulator 57 sends its signal to Voice Synthesizer 53 through Line 55. Voice Synthesizer 53 is connected through Line 51 to the remote Phone Line 54, and operates similar to Voice Synthesizer 12 of FIG. 1.

Thus, the Controller may be used as a complete system at minimum cost, or the Modem 60 and Add-On Module 37 may be added to ease installation of the invention. Still another configuration would be to incorporate the Add-On Module into the Controller 320.

Figure 8:
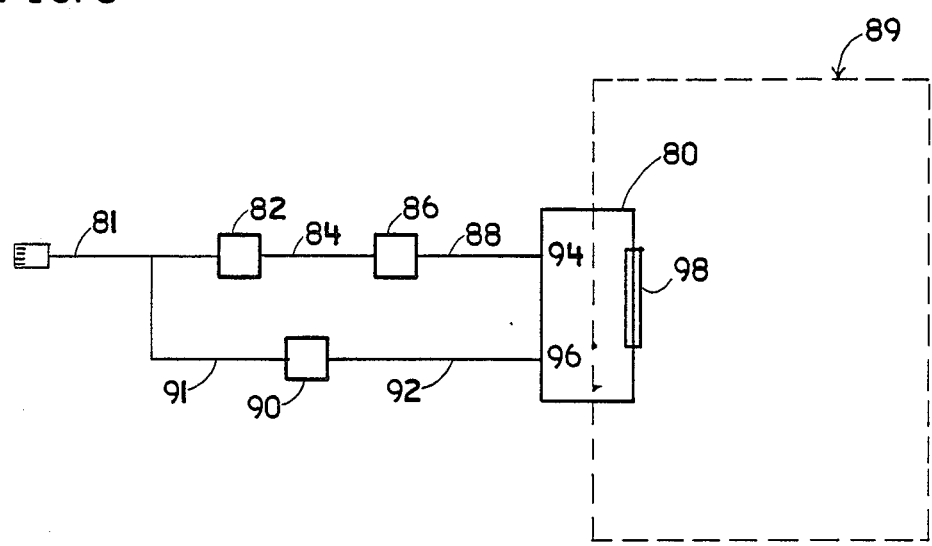
FIG. 8 is a simplified schematic diagram showing the parts to added to an VCR circuit design.

A further configuration would be to include the circuitry necessary to receive commands as part of the design of a VCR. FIG. 8 is a simplified schematic diagram showing the parts to be added to an existing VCR circuit design. Processor 80 is considered to be the processor normally used in the existing VCR design, but with increased capacity to handle the additional circuitry.

Port 98 is representative of the normal connections to the Processor 80 of an existing VCR circuit design. Phone Line 81 connects to Line Receiver 82. Line Receiver 82 is connected by Line 84 to Tone to Digital Convertor 86. Tone to Digital Convertor 86 is connected to Port 94 of Processor 80 by Line 88. Port 96 is connected by Line 92 to Voice Synthesizer 90. Voice Synthesizer 90 is connected to Phone Line 81 by Line 91.

The above circuit functions the same as described in previous configurations. The differences are that they are controlled and received by the same Processor 80 that controls the VCR's functions. This is a much simpler method of achieving the results of the invention, but cannot be added to an existing VCR. By designing the additional circuitry in to a VCR, many interfaces used to control an existing VCR are eliminated from the invention.

Figure 9:
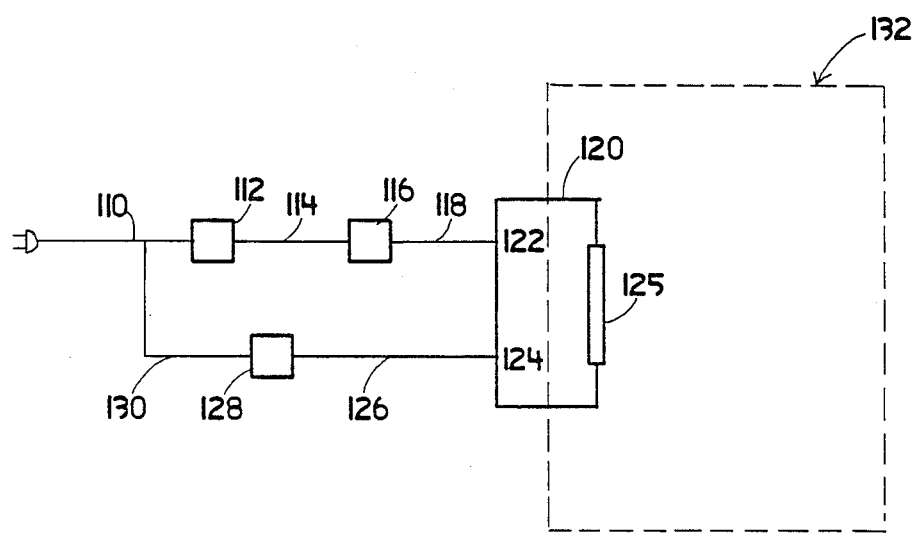
FIG. 9 is a simplified schematic diagram of a different configuration showing parts to be added to an VCR circuit design.

FIG. 9 shows a simplified schematic diagram of another configuration of the invention which is added to an existing VCR's design, but with increased capacity to handle the additional circuitry. Port 125 is representative of the normal connections to Processor 120 of the existing VCR's circuit design.

This configuration uses the Power Line 110 and 130 to transceive information to and from the Modem 60 shown in FIG. 7.

The modulating and demodulating of information and tones through the common power lines has been described previously in detail. The difference in this configuration is that the Processor 120 also controlls the VCR's functions through Port 125.

Power Line 110 connects to Demodulator 112. Demodulator 112 connects to Tone to Digital Converter 116 by Line 114. Tone to Digital Converter 116 connects to Port 122 of Processor 120 by Line 118. Port 124 connects to Modulator 128 by Line 126. Modulator 128 connects to Power Line 110 by Line 130.

TABLE 1

LIST OF FUNCTION CODES

| FUNCTION # | VALUE NUMBER AND INSTRUCTIONS FOR FUNCTION #'s 1 THROUGH 6 |
|---|---|
| 1 POWER ON | Remove Fiber Optic Coupler 28a |
| 2 POWER OFF | from invention. Advance function |
| 3 REWIND | number to desired number. Press |
| 4 RECORD | VCR's remote control button |
| 5 STOP | corresponding to the function |
| 6 CHANNEL UP | numbers selected. Simultaneously press the Enable Button 37. When value display flashes, release all buttons - entry complete. Advance function display to next desired function and repeat above steps. Replace Fiber Optic Coupler 28a. |
| 7 HIGHEST CHANNEL NUMBER | Press Advance Button 36 until Function Display 34 reads "07". Press Advance Buttons 35 until Valve Display 33 shows highest channel that the VCR channel display will show. Release Buttons 35 and press Enable Button 37. When valve display flashes, release Enable Button 37. Entry complete. |
| 8 LOWEST CHANNEL NUMBER | Press Advance Button 36 until Function Display 34 reads "08". Press Advance Buttons 35 until Value Display 33 shows lowest numbered channel that the VCR channel display will show. Release Buttons 35 and press Enable Button 37. When value display flashes, release Enable Button 37. |
| 9 TYPE OF DISPLAY | Press Advance Button 36 until Function Display 34 reads "09". Using Advance Buttons 35; Enter a "1" if your VCR has a display like FIG. 3b (place Pad 26 as shown in FIG. 3b). Enter "2" if your VCR has a display like FIG. 3d (place Pad 26 as shown in FIG. 3d). Enter a "3" if channels less than 10 read "8" not "08", or "7" not "07" (place Pad 26 as shown on FIG. 3c). |
| 10 TIME OF DAY | Enter current time (24 hr. time) using the left four digits of the Program Panel as the time display. |

Example: To enter current time of 2:41 p.m. (14:41), press Advance Button 36 until function display reads "10". Press Advance Buttons 35 until value display reads "441" and function display reads "11".

I claim:

1. A processor based controller for a video cassette recorder, comprising:
   a transceiver means to electrically connect to a telephone line to transmit or receive signals, a converter means to convert Touch Tone signals to digital words, an amplifying means to increase said processor's signal to an infrared light emitting device.

an infrared light emitting device coupled to a first fiber optic assembly which transfers said diode's light output to the VCR's remote sensor, a light detecting and quantifying means to receive light transferred by a second fiber optic assembly from the VCR's channel display, and to convert its intensity into a digital word, and a memory unit for storing programmed functions of the controller, a data entry means for entering codes to modify the processor's operations to suit different types of VCR.

2. A claim as claimed in claim 1, further including:

a voice synthesizer which creates a human speech pattern electronically to provide voice feedback to the user over the telephone line.

3. A claim as claimed in claim 1, further including:

a first circuit module which connects to the controller of claim 1, with means to modulate and demodulate signals onto/from house power line, to a second circuit module, a jack provided on said contorller of claim 1 to connect said first circuit module to controller, said second circuit module connected to telephone line and house power line, with means to modulate and demodulate signals onto/from house power line, to said first circuit module a transceiver means to electrically connect to a telephone line included in said second circuit module to transmit or receive signals.

4. A claim as claimed in claim 3, further including:

a voice synthesizer which creates a human speech pattern electronically to provide voice feedback to the user over the telephone line, and is physically mounted in said second circuit module.

* * * * *